United States Patent
Jupudi et al.

(10) Patent No.: US 10,961,909 B2
(45) Date of Patent: Mar. 30, 2021

(54) VARIABLE EVAPORATIVE COOLING SYSTEM

(71) Applicant: General Electric Company, Schenectady, NY (US)

(72) Inventors: Maruthi Manohar Jupudi, Dubai (AE); Bradly Aaron Kippel, Greenville, SC (US); Ashok Kumar Balumuri, Dwarakatirumala (IN); Majed Sammak, Dhahran (SA); Jalal Hunain Zia, Niskayuna, NY (US); Deoras Prabhudharwadkar, Dubai (AE)

(73) Assignee: General Electric Company, Schenectady, NY (US)

( * ) Notice: Subject to any disclaimer, the term of this patent is extended or adjusted under 35 U.S.C. 154(b) by 302 days.

(21) Appl. No.: 15/979,866

(22) Filed: May 15, 2018

(65) Prior Publication Data

US 2019/0353102 A1 Nov. 21, 2019

(51) Int. Cl.
*F02C 7/143* (2006.01)
*F02C 7/16* (2006.01)
*F02C 7/04* (2006.01)

(52) U.S. Cl.
CPC ........... *F02C 7/143* (2013.01); *F02C 7/04* (2013.01); *F02C 7/1435* (2013.01); *F02C 7/16* (2013.01)

(58) Field of Classification Search
CPC ........ F02C 7/1435; F02C 7/143; F02C 7/141; F02C 7/14; F02C 7/12; F02C 7/04; F05D 2260/212; F05D 2260/213
See application file for complete search history.

(56) References Cited

U.S. PATENT DOCUMENTS

| | | | |
|---|---|---|---|
| 6,250,064 B1 * | 6/2001 | Tomlinson | F01K 21/047 60/775 |
| 6,260,350 B1 | 7/2001 | Horii et al. | |
| 6,442,942 B1 * | 9/2002 | Kopko | F02C 3/36 60/726 |
| 6,478,289 B1 * | 11/2002 | Trewin | F01K 21/047 261/27 |
| 6,581,368 B2 | 6/2003 | Utamura | |
| 6,634,165 B2 | 10/2003 | Tomlinson et al. | |
| 7,028,485 B1 * | 4/2006 | Mee | F02C 7/04 415/116 |
| 7,310,950 B2 | 12/2007 | Dovali-Solis et al. | |
| 8,566,001 B2 | 10/2013 | Stuttaford et al. | |
| 9,850,816 B2 | 12/2017 | Zhang et al. | |
| 2015/0121881 A1 * | 5/2015 | Zhang | F02C 7/143 60/728 |
| 2016/0348690 A1 | 12/2016 | Larson et al. | |
| 2017/0322116 A1 | 11/2017 | Escobedo Hemadez | |

FOREIGN PATENT DOCUMENTS

| | | |
|---|---|---|
| CN | 201236746 Y | 5/2009 |
| WO | 2012166288 A1 | 12/2012 |
| WO | 2015121146 A1 | 8/2015 |

\* cited by examiner

*Primary Examiner* — Scott J Walthour
*Assistant Examiner* — Todd N Jordan
(74) *Attorney, Agent, or Firm* — Fletcher Yoder, P.C.

(57) ABSTRACT

An evaporative cooling system for a gas turbine includes a first plurality of evaporative cooling media, spaced from the other evaporative cooling media. The system also includes a plurality of valves, with water flowing through at least one valve to fully wet at least one evaporative cooling medium. In one mode of operation, at least one evaporative cooling medium remains dry.

17 Claims, 7 Drawing Sheets

VARIABLE EVAPORATIVE COOLING SYSTEM

BACKGROUND OF THE INVENTION

The subject matter disclosed herein relates generally to an inlet air conditioning system for a gas turbine and, particularly, to a system and method of operating a power plant using an evaporative cooling inlet air conditioning system to enhance the performance thereof.

A gas turbine typically includes an inlet system, a compressor section, a combustion section, a turbine section, and an exhaust section. A gas turbine may operate as follows. The inlet system receives air from the ambient environment of the gas turbine, and the compressor section compresses inlet air. The compressed airstream then flows to the combustion section where fuel mixing may occur, prior to combustion. The combustion process generates a gaseous mixture that drives the turbine section, which converts the energy of the gaseous mixture to mechanical energy in the form of torque. The torque is customarily used to drive an electrical generator, a mechanical drive, or the like.

Gas turbine and combined cycle power plant performance is commonly determined by output, thermal efficiency, and/or heat rate. The temperature and humidity of the incoming airstream have a significant impact on the gas turbine performance. Generally, the gas turbine becomes less efficient as the temperature of the airstream increases.

Various systems have been utilized to reduce the inlet airstream temperature, particularly during ambient conditions that have higher airstream temperatures and/or humidity. These systems attempt to achieve this goal by conditioning the airstream prior to entering the compressor section. Conditioning may be considered the process of adjusting at least one physical property of the airstream. The physical property may include, but is not limited to: wet-bulb temperature, dry-bulb temperature, humidity, and density. By adjusting one or more physical properties of the airstream, performance of the gas turbine can be improved.

Some known examples of these systems include media type evaporative coolers, fogger evaporative coolers, chiller coils with mechanical water chillers, absorption water chillers with or without thermal energy systems, and the like.

Media type evaporative cooling inlet air cooling systems for turbine engines use evaporative cooling systems to decrease the inlet air temperature. Evaporative cooling systems work most optimally in hot and dry environments because hot, dry air provides greater cooling capabilities than a relatively humid environment, due to the increased capacity of water to evaporate in a hot and dry environment. Evaporative cooling media is wetted as air flows by or through the media, thereby evaporating the moisture and cooling that air in the process. Evaporative cooling media is generally "over-wetted," to allow items and minerals dissolved in the water to stay dissolved, rather than accumulating on the evaporative cooling media. Stated otherwise, enough water is introduced to the evaporative cooling media to ensure that the entire surface of the evaporative cooling media remains wet during operation of the evaporative coolers. Evaporative coolers, therefore, are typically operated such that they are fully wetted, thereby avoiding partially wet conditions.

SUMMARY OF THE INVENTION

In one exemplary but non-limiting aspect, the present disclosure relates to an evaporative cooling system including a first plurality of evaporative cooling media, spaced from the other evaporative cooling media. The system also includes a plurality of valves, with water flowing through at least one valve to fully wet at least one evaporative cooling medium.

In another exemplary but non-limiting aspect, the present disclosure relates to a control system for an evaporative cooling system including a plurality of control inputs, a plurality of measured operating parameters, and a computer. The computer provides an evaporative cooling modulation parameter based on the plurality of control inputs and the plurality of measured operating parameters. The control system also includes an evaporative cooling control module which controls the amount of evaporative cooling produced by the evaporative cooling system based on the evaporative cooling modulation parameter.

In another exemplary but non-limiting aspect, the present disclosure relates to a gas turbine engine including a compressor for providing compressed air, a combustor for combusting fuel mixed with the compressed air from the compressor, a turbine receiving the combusted fuel and air from the combustor, the turbine being mechanically coupled to the compressor. The gas turbine engine includes a generator for producing power, the generator being mechanically coupled the turbine or the compressor. The gas turbine engine also includes an inlet filter house in fluid communication with and upstream of the compressor, and an evaporative cooling system disposed within the inlet filter house providing cooled air to the compressor. The evaporative cooling system includes a plurality of evaporative cooling media and at least one space separating the evaporative cooling media from each other.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Figure 1:
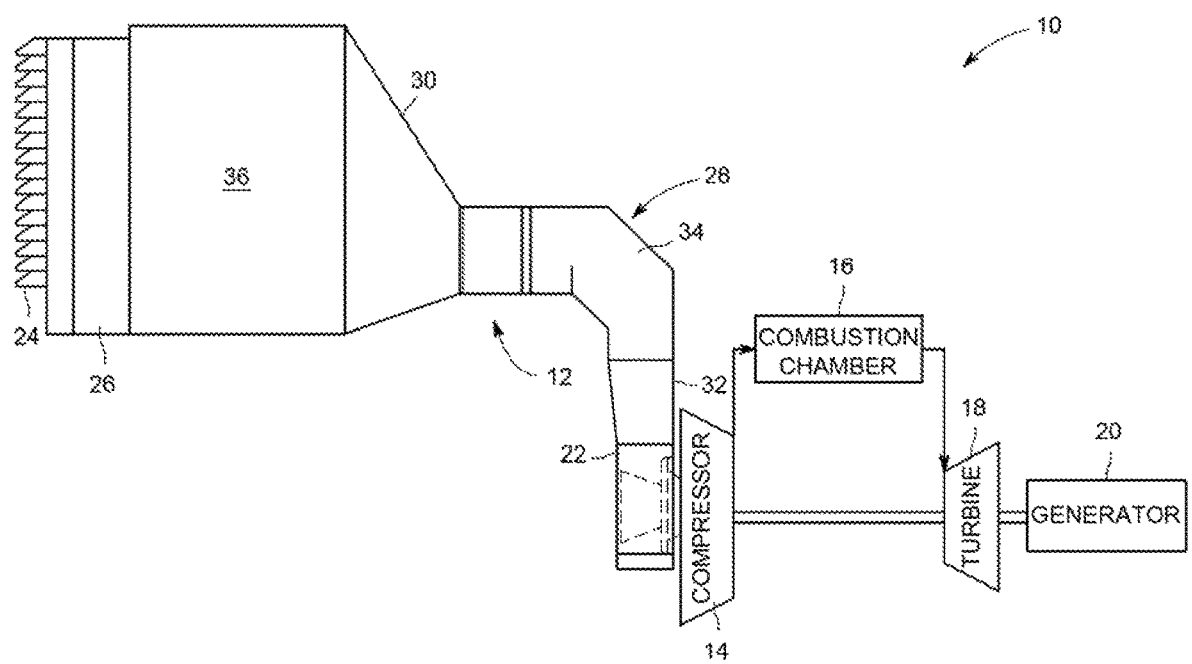
FIG. 1 is a simplified side elevation of an inlet system and a gas turbine engine shown schematically, in accordance with an exemplary but non-limiting aspect of the disclosure.

One or more specific embodiments of the present disclosure will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present disclosure may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present disclosure.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the figures. Indeed, the element or elements of an embodiment of the present disclosure may be oriented in any direction and the terminology, therefore, should be understood as encompassing such variations unless specified otherwise.

As used throughout the specification and claims, "substantially" and "about" include at least deviations from ideal or nominal values that are within manufacturing, operational and/or inspection tolerances.

The present disclosure may be applied to the variety of gas turbine engines that compress an ingested air, such as, but not limiting to, a heavy-duty gas turbine; an aero-derivative gas turbine; gas turbines used in simple-cycle applications, combined cycle applications, co-gen facilities, marine applications, industrial application and the like. An embodiment of the present disclosure may be applied to either a single gas turbine engine or a plurality of gas turbine engines. An embodiment of the present disclosure may be applied to a gas turbine engine operating in a simple cycle or combined cycle.

FIG. 1 illustrates a gas turbine engine 10 with an inlet system 12. The gas turbine engine 10 generally comprises a compressor 14, at least one combustor having a combustion chamber 16 and a turbine section 18. In land-based gas turbines, the turbine section 18 typically drives a generator 20. The compressor 14 is provided with an inlet that may include a plurality of inlet guide vanes (not shown) arranged downstream of an inlet plenum 22. The turbine section 18 is fluidly connected to an exhaust diffuser (not shown).

The inlet system 12 generally comprises a weather hood 24 mounted to an upstream end of an inlet filter house 26. The weather hood 24 is fluidly connected to the inlet plenum 22 via an inlet air duct 28. Inlet air duct 28 includes a transition duct 30 that extends to a plenum end portion 32 through an intermediate portion 34.

The inlet system 12 also includes an exemplary air cooling system 36. The details of the air cooling system are discussed in detail with respect to FIGS. 2-5 below.

Evaporative coolers operate such that the desired operational state is either fully wet or fully dry. Because of the need to keep evaporative cooling media fully wetted when in use or alternatively fully dry when not in use, conventional evaporative coolers do not have a "part-load" operating point; they are either "on" or "off." Partially wetted operation is avoided to reduce or eliminate minerals from solidifying on the media of the evaporative cooling system 36. In addition, partial wetting should be avoided to prevent top to bottom temperature stratification which can be harmful to the gas turbine compressor 14. Evaporative cooling systems 36 of the present embodiments, however, are configured to allow for partial evaporative cooling, ranging from 0% to 100% of the maximum evaporative cooling capacity. The evaporative cooling systems 36 of the present embodiments achieves this, not via partial wetting but instead by having evaporative cooling media in a serial arrangement with at least one evaporative cooling medium fully wetter and at least one completely dry. The system of the present embodiments may also be run at 100% evaporative cooling with all of evaporative cooling media fully wetted.

Figure 2:
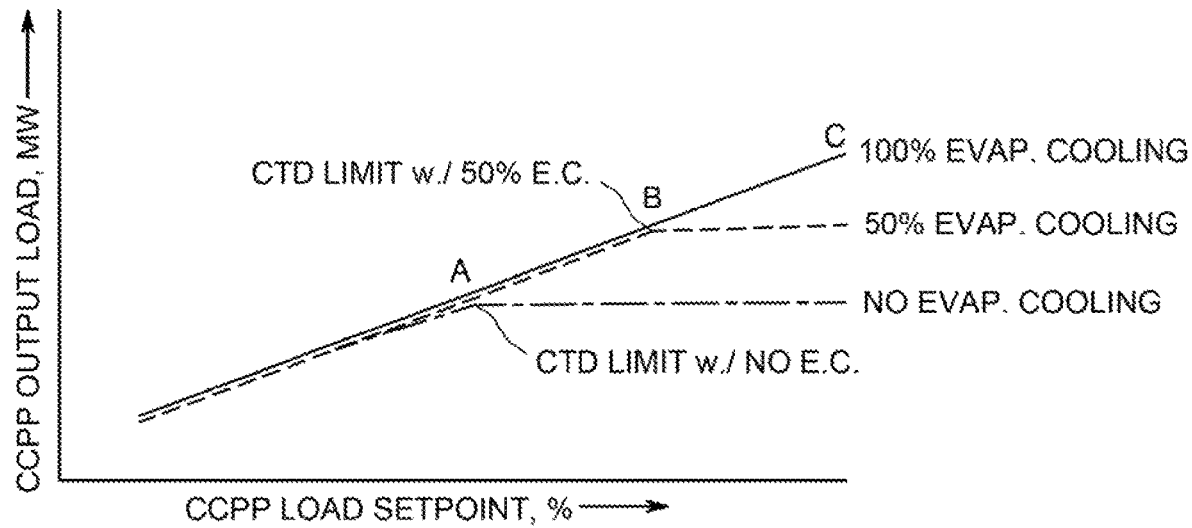
FIG. 2 is a schematic diagram illustrating the relationship between combined cycle power output and load setpoint with evaporative cooling in service, out of service and at 50%.

FIG. 2 is a graphical schematic illustration of the characteristic between a gas turbine power output load 38 and the gas turbine load setpoint 40 with evaporative cooling in operation, out of operation and at 50% evaporative cooling. The output load increases proportionally with the load setpoint for all three lines shown in FIG. 2 until a compressor discharge temperature (CTD, also commonly called $T_{CD}$) limit 42 is reached when no evaporative cooling is in service at point A on FIG. 2. At higher load setpoints 40 to the right of point A, no additional output load 38 is produced with evaporative cooling not in service. However, at higher load setpoints 40 to the right of point A, the 50% evaporative cooling and 100% evaporative cooling curves continue to have an associated output load 38 increase. At point B, the 50% evaporative cooling curve also reaches a compressor discharge temperature (CTD) limit 42. Beyond the compressor discharge temperature (CTD) limit 42, i.e., to the right of point B in FIG. 2, the 50% evaporative cooling curve has reached a maximum value, and will no longer continue to increase the output load, 38. The 100% evaporative cooling curve does not reach a CTD limit until point C in FIG. 2, and will continue to experience an increase in the output load 38, up until this point.

As illustrated in FIG. 2, at load setpoints 40 corresponding to values to the right of point A, running evaporative coolers becomes necessary. Similarly, at load setpoints 40 corresponding to values to the right of point B, running evaporative coolers at higher than 50% becomes necessary. The exemplary schematic of FIG. 2 also illustrates that reaching the load setpoint 40 corresponding to point C is only possible using 100% evaporative cooling. Other evaporative cooling operating points other than 50% and 100% are also possible. For example, it is possible to run at the full range of evaporative cooling from 0% to 100%.

Figure 3:
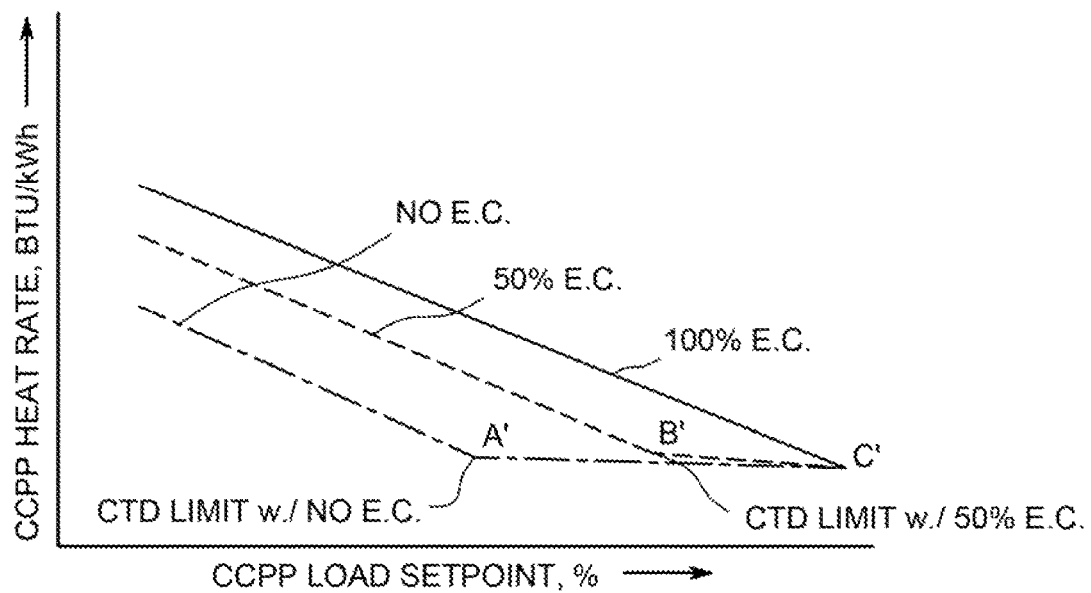
FIG. 3 is a schematic diagram illustrating the relationship between combined cycle heat rate and load setpoint with evaporative cooling in service, out of service and at 50%.

FIG. 3 is a diagrammatic schematic illustrating the characteristic between a combined cycle power plant heat rate 44 as a function of the combined cycle load setpoint 40 with evaporative cooling in operation, out of operation and at 50% evaporative cooling. Heat rate is the amount of thermal energy (in British thermal units, BTUs) the gas turbine or combined cycle power plant requires as input for every unit of generated output power (in kilowatt hours, kWh). Heat rate is inversely proportional to gas turbine or combined cycle power plant efficiency. As such, gas turbines and combined cycle power plants operating at lower heat rates are operating more efficiently than gas turbines and combined cycle power plants operating at higher heat rates.

Points A', B' and C' in FIG. 3 correspond to points A, B and C from FIG. 2 and all occur at identical load setpoints 40. For example, point A' in FIG. 3. occurs when the compressor discharge temperature (CTD) limit 42 is reached when no evaporative cooling is in service, and occurs at the same load setpoint 40 as point A in FIG. 2. FIG. 3 is vertically aligned with FIG. 2 so that point A lines up with point A', point B lines up with point B' and point C lines up with C'. FIG. 3 illustrates that a lower heat rate, and thus a more efficient operating point, can be achieved when using less evaporative cooling during combined cycle operation. Stated otherwise, combined cycle operation may be enhanced with lower levels of evaporative cooling, for a given load demand. Gas turbines operating in simple cycle systems may have different optimal operating conditions than gas turbines operating in combined cycle systems. At points to the left of point A' in FIG. 3, the no E.C. curve is at a lower heat rate than the 50% E.C. curve for a given load setpoint 40. Similarly, at points to the left of point A' in FIG. 3, the 50% E.C. curve is at a lower heat rate than the 100% E.C. curve for a given load setpoint 40. This effect is the result of the performance-related tradeoff between higher mass flow of air through the turbine versus higher operating temperatures. Operating with evaporative cooling in service causes the compressor inlet temperature (CIT) 46, (shown also in FIG. 5) to drop which in turn allows a higher mass flow through the gas turbine (which operates at a constant volume flow) due to air having a higher density at lower temperatures. Therefore, at a given load setpoint 40, at points to the left of point A', the 100% E.C. curve will be associated with a higher mass flow rate but lower combustor firing temperature 48 than then no E.C. curve. A higher combustor firing temperature 48 is associated with both a higher output load 38 as well as a higher cycle efficiency. As such, increasing power output by raising the combustor firing temperature 48 results in higher efficiency and lower heat rate operating condition than increasing power by increasing the mass flow rate through the gas turbine would.

As illustrated in FIG. 3, at load setpoints 40 to the left of A', operating with no evaporative cooling (but at a higher combustor firing temperature) results in the highest achievable efficiency and the lowest heat rate, compared to operating with evaporative cooling in service. However, as illustrated in FIG. 2, reaching load setpoints to the right of point A, and especially to the right of point B are only possible with evaporative cooling in service. With legacy systems in which evaporative cooling can only be operated at 100% capacity or not at all, achieving higher load setpoints 40 (for example operating at point B on FIG. 2) necessarily means operating at a less efficient operating condition, as illustrated at the point corresponding to B' on the 100% E. C. curve in FIG. 3. Therefore, being able to select the lowest evaporative cooling operating percentage from 0% to 100% that also allows the combined cycle power plant to reach the load setpoint 40, results in more efficient combined cycle operation compared to only being able to operate at 0% or 100%. For gas turbines in combined cycle systems, operating with less evaporative cooling for a given combined cycle load demand results in a higher plant efficiency due, at least in part, to higher gas turbine exhaust energy, which in turn results in increased energy available to the steam turbine generator.

FIGS. 2 and 3 illustrate that legacy systems that allow evaporative cooling operation only at 100% or 0% evaporative cooling are limited during certain operating conditions in which the only option that allows the load setpoint 40 to be achieved necessitates running the evaporative coolers at 100%, which is associated with a less efficient heat rate compared to running the evaporative coolers at part cooling. The exemplary examples of FIGS. 2 and 3 are described in terms of a compressor discharge temperature (CTD) limit 42. However, in other embodiments in accordance with the systems described here, gas turbine engines may employ other control limits and/or other control parameters.

As used herein, evaporative cooling percentage levels are relative to a maximum level of evaporative cooling. For example, 100% evaporative cooling refers to the maximum amount of evaporative cooling the system 36 is capable of producing. Similarly, 50% evaporative cooling refers to half of the maximum amount of evaporative cooling the system 36 is capable of producing. It is noted that evaporative cooling percentage levels as used herein differ in definition from effectiveness percentages.

Figure 4:
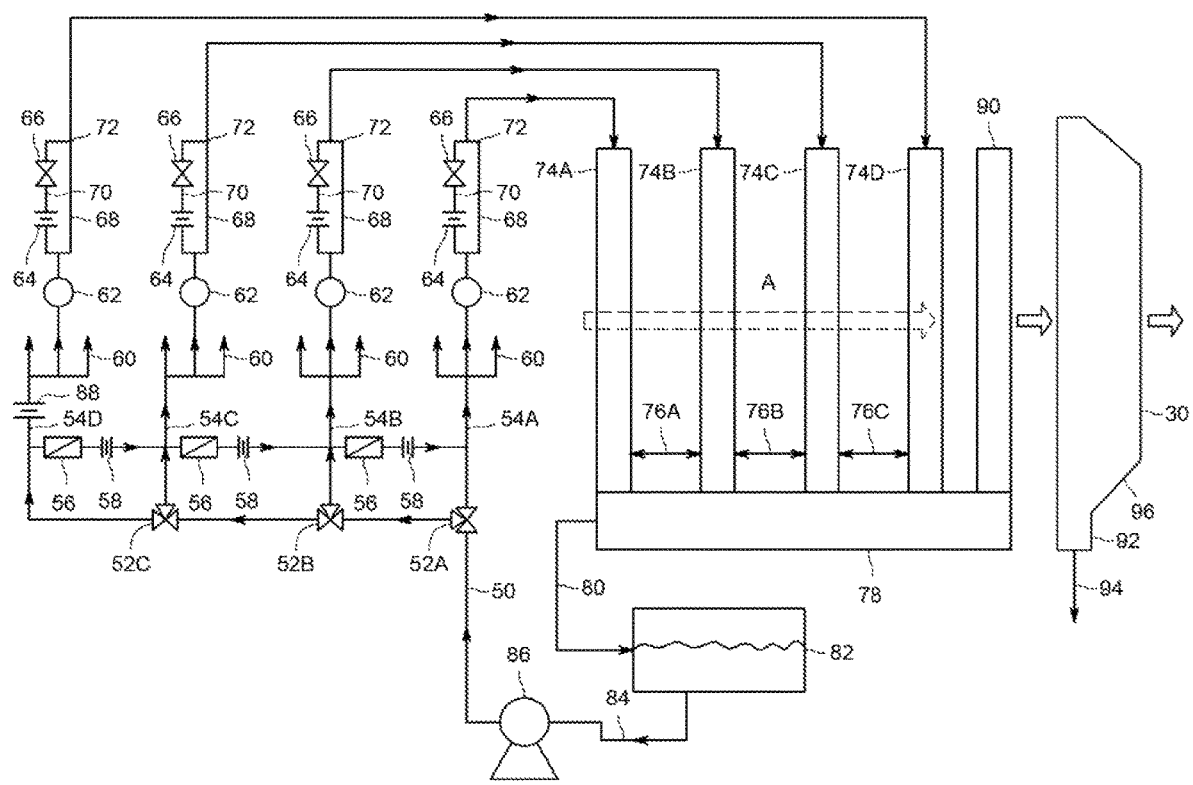
FIGS. 4, 4A and 4B are representations of evaporative cooling system.

FIG. 4 illustrates a schematic of the evaporative cooling system 36. A supply line 50 fluidly connects to a first three-way valve 52A, the supply line 50 supplying water to the evaporative cooling system 36. The first three-way valve 52A fluidly connects to a second three-way valve 52B and a first piping manifold 54A. The second three-way valve 52B fluidly connects to a second piping manifold 54B and a third three-way valve 52C. The third three-way valve 52C fluidly connects to a third piping manifold 54C and a fourth piping manifold 54D. Each of the first, second and third three-way valves, 52A, 52B and 52C allows water to flow to either of the two respective fluid connections, both connections concurrently or neither of the respective connections. Between each of the first, second, third and fourth piping manifolds 54A-54D is additional piping which may include a check valve 56 allowing flow in only one direction, and a first orifice plate 58, which helps regulate the flow.

Each of the first, second, third, and fourth piping manifolds 54A-54D includes a three-way tee 60 which splits the flow within each of the respective piping manifolds into three streams. The inlet filter house 26 may be more than one story high and may be divided into multiple levels. For example, the inlet filter house 26 may have three individual levels. Each of the three streams from the three-way tee 60 leads to one of the levels of the inlet filter house 26. In systems that have two-level inlet filter houses 26, a two-way tee with two streams may be used instead of a three-way tee 60. Similar arrangements would arise in systems with four-level inlet filter houses 26 and/or any other number of levels. Similar arrangements would also arise in systems with adjacent evaporative cooler blocks next to each other on the same level of an inlet filter house. For simplicity, only a single level is shown in FIG. 4; other levels would have substantially similar configurations of piping arrangements, valves, orifice plates, etc. to what is shown in FIG. 4. A flowmeter 62 downstream of and in fluid communication with the three-way tee 60 measures the flow through each stream of the first, second, third and fourth piping manifolds 54A-54D. Downstream of the flowmeter 62 are a primary line 68 and a secondary line 70, the primary line 68 and secondary line 70 being in a parallel flow relationship. The secondary line 70 includes a second orifice plate 64 and a trim valve 66. The secondary line 70 joins the primary line 68 at union 72. Other arrangements of the present embodiments may not include the secondary line 70, the flowmeter 62 and the various orifice plates 58, 64, 88.

Referring still to FIG. 4, the first piping manifold 54A directs flow to a first evaporative cooling medium 74A, downstream of union 72. Similarly, the second, third, and fourth piping manifolds 54B-54D lead to second, third, and fourth evaporative cooling media 74B-74D downstream of their respective unions 72. The second evaporative cooling medium 74B is separated from the first evaporative cooling medium 74A by a first space 76A. The third evaporative cooling medium 74C is separated from the second evaporative cooling medium 74B by a second space 76B. Similarly, the fourth evaporative cooling medium 74D is separated from the third evaporative cooling medium 74C by a third space 76C. Located underneath each of the first, second, third and fourth evaporative cooling media 74A-74D, and spanning the length of the same, is at least one collector pan 78 for capturing water that flows off of the first, second, third and fourth evaporative cooling media 74A-74D.

The collector pan 78 feeds a collector pan drain line 80 which delivers water from the collector pan 78 to a water tank 82. Water exits the water tank 82 via a pump intake line 84, which supplies water to pump 86. Water exits pump 86 via supply line 50, thereby completing one full water circuit of the evaporative cooling system 36. Each of the first, second, third, and fourth piping manifolds 54A-54D may also have a third orifice plate 88 located upstream of the three-way tee 60. The evaporative cooling system 36 may also include other components such as manual isolation valves, flush valves, different size orifice plates and other components. For example, each of the water tank 82 and the collector pan 78 may have separate drain lines (not shown). The water tank 82 may also have a separate supply line, a level indicator, water chemistry sensors and other components not shown in FIG. 4. The system may include multiple pumps, filters, relief valves and other components not shown in FIG. 4. For example, the evaporative cooling system 36 may use multiple pumps during conditions in which a high level of evaporative cooling is desired and only a single pump when less or no evaporative cooling is desired. In addition, the evaporative cooling system 36 may include flush valves and/or isolation valves in the piping delivering water to each of the evaporative cooling media 74A-74D, allowing the system to be flushed or isolated, without requiring that water in the system to necessarily have to pass through evaporative cooling media 74A-74D in order to exit the system.

During operating, the first, second, and third three-way valves 52A-52C control the flow of water to each of the first, second, third, and fourth piping manifolds 54A-54D and ultimately to the first, second, third, and fourth evaporative cooling media 74A-74D. The evaporative cooling system 36 can be operated such that one or more of the first, second, third and fourth evaporative cooling media 74A-74D are out of service while one or more of the same are in service. Each of the first, second, third, and fourth piping manifolds 54A-54D including any orifice plates are sized such that if the respective evaporative cooling media 74A-74D is in service, sufficient water will be provided to ensure the evaporative cooling medium or media in question is fully wetted. Stated otherwise, flow through only the primary line 68 of a given piping manifold 54A-54D and not also through the secondary line 70 will provide full wetting to the downstream evaporative cooling media 74A-74D. The trim valve 66 is used for fine field adjustments during the initial installation of the evaporative cooling system 36. Although the primary line 68 is sized so as to ensure the downstream evaporative cooling media 74A-74D are fully wetted, variations in piping arrangements as well as additional flow resistance may be introduced to the system during construction. As such, the trim valve 66 and second orifice plate 64 can be adjusted to ensure enough water flow to the evaporative cooling media 74A-74D. Such system adjustments via the secondary line 70 and the trim valve 66 ensure the evaporative cooling media 74A-74D are fully wetted when in service. As used herein, the term "fully wetted" is defined as covering the entire outer surface of the evaporative cooling media with water in liquid phase. In addition, the first orifice plate 58, the second orifice plate 64 and the third orifice plate 88 may all be sized individually to introduce the desired resistance to flow into the system in order to enhance the system flow characteristics. Stated otherwise, first orifice plate 58, the second orifice plate 64 and the third orifice plate 88 may all be different sizes.

By operating the evaporative cooling system 36 with different numbers of evaporative cooling media 74A-74D in service, the evaporative cooling percentage can be varied from 0% to 100%. As discussed above, the system of the present embodiments allows the gas turbine engine 10 and evaporative cooling system 36 to be operated with the minimum amount of evaporative cooling while still allowing the gas turbine engine 10 to achieve the load setpoint 40. The first, second, and third spaces 76A, 76B and 76C ensure that any of the evaporative cooling media 74A-74D that are fully wetted will not cause the adjacent evaporative cooling medium 74A-74D to be wetted. If the evaporative cooling media 74A-74D is only partially wetted, the possibility exists that various minerals dissolved in the water will consolidate or solidify on the surface of the evaporative cooling media 74A-74D fouling up the evaporative cooling media 74A-74D, decreasing the heat and mass flow area and reducing the effectiveness of the evaporative cooling media 74A-74D. The first, second, and third spaces 76A, 76B, and 76C allow each of the evaporative cooling media 74A-74D to be fully wetted or completely dry while providing flexible operating of the evaporative cooling system at desired increments between 0-100% evaporative cooling. It may be preferable for the first, second, and third spaces 76A, 76B, and 76C to all be the same distance, however different spacings are also possible.

At A, FIG. 4 illustrates the airflow that passes through the evaporative cooling system 36. Upon exiting the final stage of evaporative cooling media (74D in the embodiment shown in FIG. 4, air enters a drift eliminator 90 which is spaced from the evaporative cooling medium 74D and helps to eliminate drift of the cooling air prior to the air entering a transition duct 30 between the evaporative cooling system 36 and the inlet air duct 28. At the bottom of the transition duct 30 is a collector tray 92 that collects any residual water particles that have not evaporated into the air. A tapered portion 96 of the transition duct 30 encourages water particles to flow toward the collector tray 92 where they can exit via the collector tray drain line 94, thereby minimizing or eliminating the water particles entering the downstream turbine compressor section 14.

Operating any combination of evaporative cooling media 74A-74D may result in the desired level of evaporative cooling being achieved. For example, operating only the first evaporative cooling medium 74A and the fourth evaporative cooling medium 74D while keeping the second and third first evaporative cooling media 74B and 74C dry may produce the desired result. Similarly, operating only the first and third, the first and second, the second and third, the second and fourth or the third and fourth evaporative cooling media 74A-74D may produce the desired result. Alternatively, there may be conditions in which operating with only a single evaporative cooling medium is desired, in which case any of the four evaporative cooling media 74A-74D may be operated while the remaining three are not in operating. Similarly, it may be necessary for three of the four evaporative cooling media 74A-74D to be operating with one of the four not in service. Similarly, it may be necessary for all four of the four evaporative cooling media 74A-74D to be operating to achieve 100% evaporative cooling. The chosen mode of operating may vary based on a number of conditions including how deteriorated an evaporative cooling medium is, the relative humidity, concurrent servicing of portions of the evaporative cooling system 36, the ambient temperature, real-time flow within each piping manifold 54A-54D as measured by the flowmeter 62, the load setpoint 40, as well as other conditions.

Several possible modes of operation exist for achieving the desired level of evaporative cooling. As discussed above, operating with different combinations of evaporative cooling media 74A-74D in service and out of service will yield different levels of evaporative cooling. Opening or adjusting the trim valves 66, as needed, ensures the evaporative cooling media 74A-74D remain fully wetted during operation. In addition, operating with at least one level of filter house 26 evaporative cooling in service with at least one level of filter house 26 of evaporative cooling out of service will also provide operational flexibility in arriving at the desired level of evaporative cooling. In one embodiment, each of the three streams at the three-way tee 60 (leading to each of the three levels of the inlet filter house 26) will have an isolation valve so that evaporative cooling can be placed in service or taken out of services as needed for each individual inlet filter house level.

The evaporative cooling system 36 is described as having four individual evaporative cooling media 74A-74D, however other numbers of evaporative cooling media 74A-74D are possible. As illustrated in FIG. 4, each of the four piping manifolds 54A-54D fluidly connects to the respective first through fourth evaporative cooling media 74A-74D such that from the point of the view of the water, the first through fourth evaporative cooling media 74A-74D are in a parallel flow relationship. However, as also illustrated in FIG. 4, from the perspective of the airflow A, the first through fourth evaporative cooling media 74A-74D are in series with each other. Stated otherwise, the airflow enters first evaporative cooling medium 74A, the proceeds downstream to the second evaporative cooling medium 74B, then to the third evaporative cooling medium 74C and finally to the fourth evaporative cooling medium 74D. During operating of the evaporative cooling system 36 in which at least one or the evaporative cooling media 74A-74D is in service and at least one of the evaporative cooling media 74A-74D is out of service, air still flows past all four evaporative cooling media 74A-74D. However, as it flows past the evaporative cooling media 74A-74D that are not in service, no evaporative cooling takes place. In other embodiments, louvres or other mechanisms (not shown) can be used for rotating evaporative cooling media 74A-74D when it is not in use so air can more freely flow past. Other devices used to retract the evaporative cooling media 74A-74D when not in use are also possible.

Figure 4A:
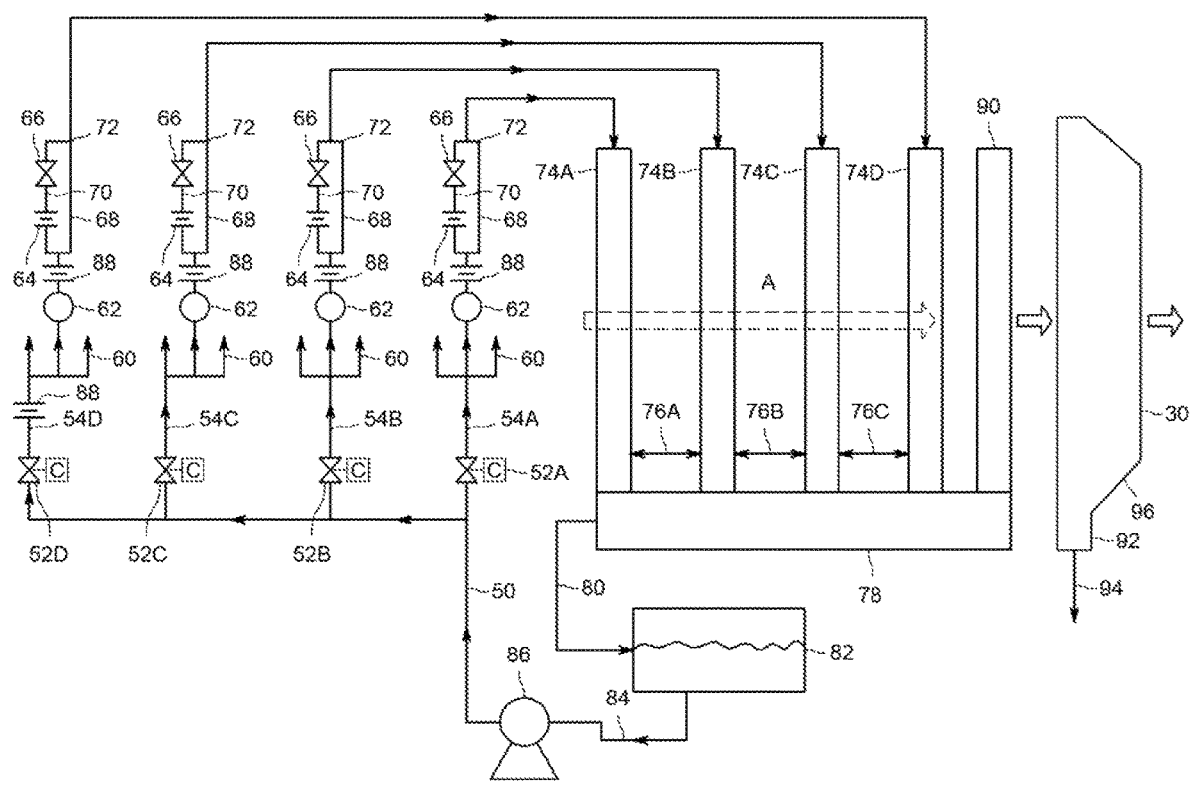

FIG. 4A illustrates an embodiment of the present invention in which the flow to each of the four piping manifolds 54A-54D is controlled via individual ball valves 52A-52D respectively.

Figure 4B:
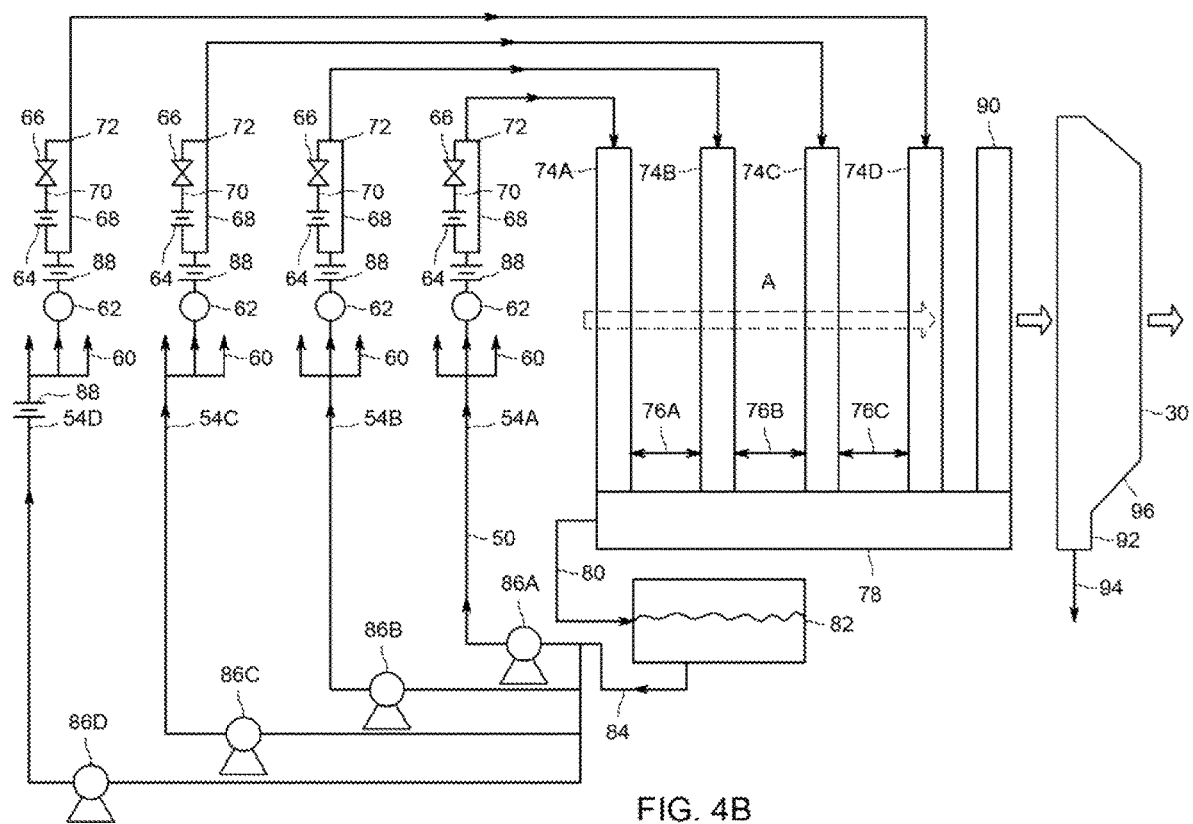

FIG. 4B illustrates an embodiment of the present invention in which each of the four piping manifolds 54A-54D is individually fed from one of four pumps 86A through 86D, respectively. Other variations, configurations and arrangements of piping and various components combining various aspects of the elements shown in FIGS. 4, 4A and 4B are also possible.

Figure 5:
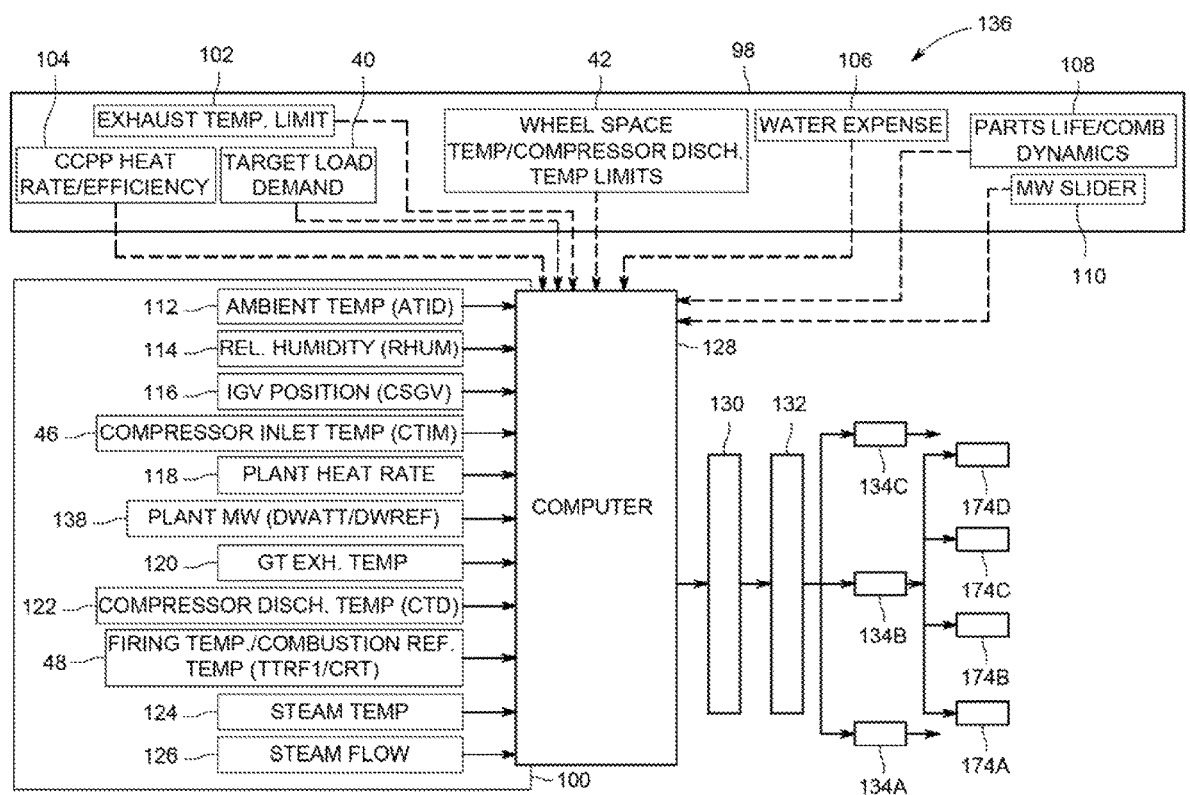
FIG. 5 is a schematic diagram illustrating the control.

FIG. 5 illustrates a control schematic 136 for the gas turbine engine 10 and evaporative cooling system 36, including a plurality of control inputs 98 and a plurality of measured operating parameters 100. The plurality of control inputs 98 may include an exhaust temperature limit 102, a heat rate target 104, a target load demand or setpoint 40, a wheel space temperature or compressor discharge temperature (CTD) limit 46, a water expense input 106, a parts life or combustor dynamics input 108 and a MW slider 110. The plurality of control inputs 98 may also include other control inputs that are used for controlling a gas turbine. The water expense input 106 may be used to allow for varying water costs (expensive at some sites, free at other sites) as well as to account for limitations in the availability of water and/or a limited supply of water. The parts life or combustor dynamics input 108 accounts for the cost that firing temperatures have on gas turbine engine 10 components. The MW slider 110 describes the mode in which a power plant will be operating in cases where multiple gas turbines and/or steam turbines can be selectively operated in order to meet an overall power plant target load demand 40.

The plurality of measured operating parameters 100 includes measured values from combined cycle power plant and/or gas turbine engine 10 instrumentation including ambient temperature 112, relative humidity 114, inlet guide vane (IGV) position 116, compressor inlet temperature 46, plant heat rate 118, plant output load 138, gas turbine exhaust temperature 120, compressor discharge temperature 122, combustor firing temperature 48, steam temperature 124, steam flow 126, and other measured operating parameters. The steam temperature 124 and steam flow 126 may be associated with embodiments in which the gas turbine engine 10 is in a combined cycle application including at least one steam turbine (not shown). Alternatively, the steam flow and steam temperature 124 may be associated with gas turbine engines 10 that have steam cooled cooling circuits (not shown) for cooling gas turbine engine 10 components. The plurality of measured operating parameters 100 and the plurality of control inputs 98 are both inputs to the computer 128 which produces an evaporative cooling modulation 130 from 0 to 100%. The calculated evaporative cooling modulation 130 in then input into the evaporative cooling control module 132 which controls: 1) the levels of the evaporative cooling 134A-134C, and 2) which evaporative cooling media 174A-174D to place in service. For example, at 134B the evaporative cooling control module 132 places evaporative cooling second level 134B in service.

The evaporative cooling control module 132 selects which of the first, second, third, and fourth evaporative cooling media 74A-74D to place in service via the respective first, second, third, and fourth evaporative cooling media selectors 174A-174D. The control schematic 136 of FIG. 5 shows control logic for the second level of evaporative cooling 134B (i.e., corresponding to the evaporative cooling media 74A-74D on the second level of the inlet filter house 36) but the control schemes would be similar for the first and third levels of evaporative cooling 134A and 134C. The evaporative cooling control module 132 may also include a feedback loop (not shown) that uses the water flow within each piping manifold 54A-54D as measured by the flowmeter 62 to determine if enough flow is being provided to the evaporative cooling media 74A-74D to ensure they are fully wetted. In addition, the evaporative cooling control module 132 may control at least one evaporative cooling media 74A-74D media on each of the three levels of evaporative cooling 134A-134C to be in service and at least one of the evaporative cooling media 74A-74D on each of the three levels of evaporative cooling 134A-134C to be out of service. Stated otherwise, the evaporative cooling control module 132 may control all three levels of evaporative cooling 134A-134C to be at least partially in service rather than controlling each of the three levels of evaporative cooling 134A-134C to be fully in service or fully out of service.

The control schematic 136 of FIG. 5 may be communicatively coupled to a digital application with a graphical user interface (GUI; not shown) such that the operating mode of the gas turbine engine 10, evaporative cooling system 36 and/or combined cycle power plant can be enhanced in light of one or more priorities. For example, a user might choose at least one of a combined cycle power plant target load demand 40, a plant heat rate 118, parts life 108, water expense 106, gas turbine exhaust temperature 120, and/or steam flow 126, as well as other control inputs 98 and measured operating parameters 100, as the priority or priorities. The computer 128, in connection with the evaporative cooling modulation parameter 130 and the evaporative cooling control module 132, can then select the appropriate control inputs 98 to enhance the operation of the combined cycle power plant according to the chose priorities. The digital application with a graphical user interface (GUI; not shown) may be running on an electronic device (not shown) that is communicatively coupled with the computer 128, which in turn may adjust the control inputs 98 according to the priorities chose by the user using the electronic device. As such, the electronic device running the digital application may both receive information from and transmit information to the computer 128 and/or other power plant control system computers and controllers.

In operation, the gas turbine engine 10 and evaporative cooling system 36 may be able to achieve discreet levels of evaporative cooling by selectively controlling each of the several evaporative cooling media 74A-74D to be in service or out of service. For example, a given system may be able to achieve the following evaporative cooling levels: 0%, 5%, 20%, 35%, 45%, 65%, 80%, 90% and 100%. Other systems may achieve fixed intervals of evaporative cooling levels, for example intervals every 5%, 10%, 20% or 25%. Accordingly, the control schematic 136 may select the discrete evaporative cooling level closest to the level arrived at by the evaporative cooling modulation parameter 130. Other operating parameters of the gas turbine engine 10 such as IGV position 116 and firing temperature 48 can then be used to meet the plant target load demand 40. The discrete evaporative cooling levels may be established for a given system during initial commissioning or construction of the system. Stated otherwise, when an evaporative cooling system 36 according to the present embodiments is placed into operations, the discrete evaporative cooling levels of the system may have already been predetermined. Alternately, the discrete evaporative cooling levels may be determined dynamically and may differ for a given system based on the real-time operating and environmental conditions.

Figure 6:
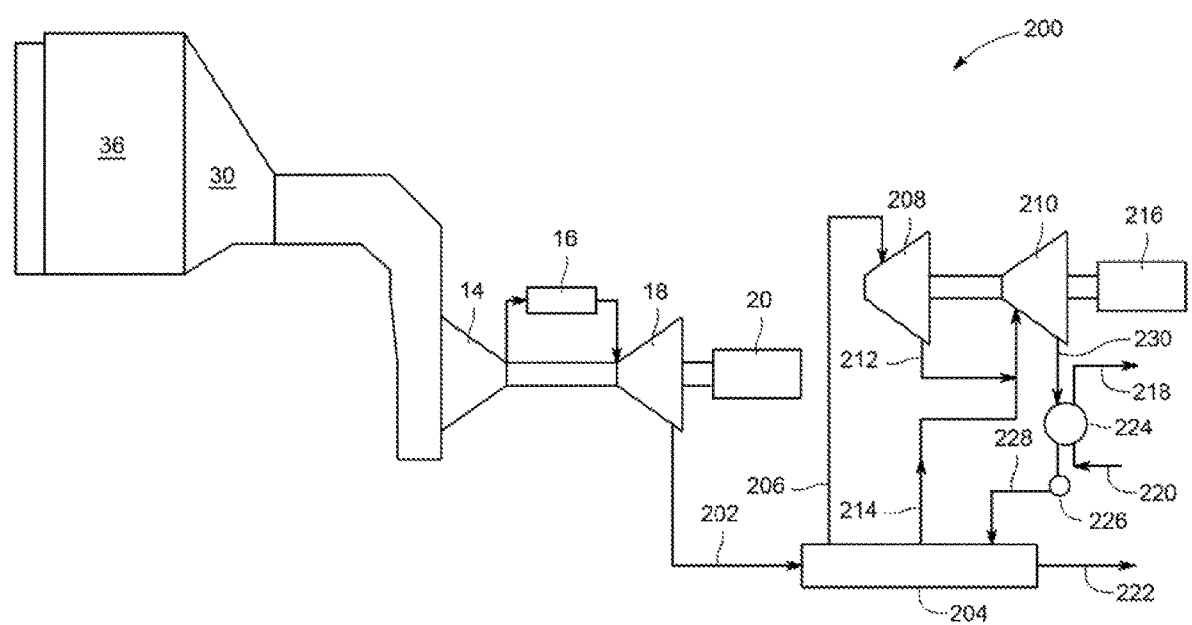
FIG. 6 is a simplified side elevation of an inlet system and a gas turbine engine in a combined cycle application of the exemplary but non-limiting examples.

FIG. 6 illustrates a gas turbine engine 10 and evaporative cooling system 36 of the present claimed embodiments in a combined cycle application including a gas turbine exhaust stream 202 entering a heat recovery steam generator (HRSG) 204 which generates a high pressure steam 206 that feeds a high pressure steam turbine section 208. Using the thermal energy in the gas turbine exhaust stream 202, the HRSG 204 also produces low pressure stream 214 which joins with a high pressure turbine exit stream 212 prior to feeding a low pressure turbine 210. The high pressure 208 and low pressure 210 turbine sections are mechanically coupled to a steam turbine generator 216 which produces electrical power. The steam turbine exhaust 230 enters a condenser 224 where it condenses prior to being pressurized in a pump 226. A condenser cooling flow inlet 220 and exit 218 absorb the latent heat given off by the steam turbine exhaust 230 when it condenses from steam to water. After existing the pump 226, water returns to the HRSG 204 where it is turned into steam using energy from the gas turbine exhaust stream. The exemplary combined cycle power plant 200 of FIG. 6 is one of many possible combined cycle arrangements and may include several other components including but not limited to aerators, additional pumps, intermediate pressure turbines, blow down lines, heaters, emissions mitigation equipment, stacks, drums, additional HRSG stages, vent valves, control units, electrical equipment, power distribution equipment, etc. The exemplary combined cycle power plant 200 of FIG. 6 may include multiple gas turbines and multiple steam turbines. For example, the exemplary combined cycle power plant 200 of FIG. 6 may have two, three, four or another number of gas turbine engines 10 feeding a single steam turbine. The exemplary combined cycle power plant 200 of FIG. 6 may also have a single gas turbine feeding a single steam turbine. The exemplary combined cycle power plant 200 of FIG. 6 may the same number of HRSG 204s as gas turbine engines 10.

The embodiments described herein allow a gas turbine engine 10 or power plant to run at a desired operating condition taking into account a combined cycle load demand setpoint 40. By modulating the amount of evaporative cooling from an evaporative cooling system 36, the load demand setpoint 40 can be achieved using the desired amount of evaporative cooling, allowing for an efficient mode of operation. In addition, operational factors such as water availability and cost as well as other economic factors such as the impact of gas turbine operation on component life are also accounted for by the control algorithms of the present embodiments resulting in a desired operating mode based on the several factors described above.

For certain part load operating scenarios of combined cycle and/or co-gen plant operation, the present systems yield lower cost operation compared to systems in which evaporative cooling can only be run at 0% or 100% with no intermediate evaporative cooling modulation, due to increased gas turbine exhaust energy which increases the energy available to the steam turbine, and due to higher gas turbine firing temperatures. Thus, the systems of the present embodiments provide greater operating power plant efficiency than traditional evaporative cooling systems.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system comprising:
   an evaporative cooling system for a gas turbine engine, comprising:
   a first plurality of evaporative cooling media, wherein each evaporative cooling medium of the first plurality of evaporative cooling media is spaced from each other evaporative cooling medium of the first plurality of evaporative cooling media;
   a plurality of valves, wherein each valve of the plurality of valves is independently controlled between an open position to enable fluid flow to a respective evaporative cooling medium of the first plurality of evaporative cooling media and a closed position to disable fluid flow to the respective evaporative cooling medium of the first plurality of evaporative cooling media, wherein the open position corresponds to an on state of evaporative cooling and wherein the closed position corresponds to an off state of evaporative cooling; and
   a controller, wherein the controller is configured to provide discrete levels of evaporative cooling by independently controlling each of the plurality of valves to vary a number of the first plurality of evaporative cooling media in the on state based on a load setpoint of the gas turbine engine and a priority between a first parameter and a second parameter, wherein the first parameter benefits from a greater amount of evaporative cooling with increases in the load setpoint, and the second parameter benefits from a lesser amount of evaporative cooling with decreases in the load setpoint.

2. The system of claim 1, wherein each evaporative cooling medium of the first plurality of evaporative cooling media is in a series flow relationship with each other evaporative cooling medium of the first plurality of evaporative cooling media with respect to air flowing through the first plurality of evaporative cooling media, and
   wherein each evaporative cooling medium of the first plurality of evaporative cooling media is in a parallel flow relationship with each other evaporative cooling medium of the first plurality of evaporative cooling media with respect to water flowing over the first plurality of evaporative cooling media.

3. The system of claim 2, wherein the first plurality of evaporative cooling media comprises at least three evaporative cooling media.

4. The system of claim 2, wherein the first plurality of evaporative cooling media comprises at least four evaporative cooling media.

5. The system of claim 1, wherein the first parameter comprises a power output of the gas turbine system that benefits from the greater amount of evaporative cooling with increases in the load setpoint, and the second parameter comprises a heat rate of the gas turbine system that benefits from the lesser amount of evaporative cooling with decreases in the load setpoint.

6. The system of claim 1, further comprising:
   a gas turbine engine inlet filter house;
   a second plurality of evaporative cooling media; and
   a third plurality of evaporative cooling media, wherein each of the first plurality of evaporative cooling media, the second plurality of evaporative cooling media, and the third plurality of evaporative cooling media are located on different vertical levels of the gas turbine engine inlet filter house, wherein the controller is configured to control numbers of evaporative cooling media in the on state in each of the first plurality of evaporative cooling media, the second plurality of evaporative cooling media, and the third plurality of evaporative cooling media to provide discrete levels of evaporative cooling.

7. The system of claim 6, wherein the different vertical levels of the first plurality of evaporative cooling media, the second plurality of evaporative cooling media, and the third plurality of evaporative cooling media are in parallel along an air flow path through the gas turbine engine inlet filter house, wherein the first plurality of evaporative cooling media are in series along the air flow path, wherein the second plurality of evaporative cooling media are in series along the air flow path, and wherein the third plurality of evaporative cooling media are in series along the air flow path.

8. The system of claim 1, wherein the controller is configured to minimize the number of the first plurality of evaporative cooling media in the on state to minimize evaporative cooling while meeting the load setpoint.

9. The system of claim 4, wherein the plurality of valves comprise at least one three-way valve;
   the system further comprising:
   at least one flowmeter, the at least one flowmeter downstream of the at least one three-way valve and upstream of the first plurality of evaporative cooling media;
   at least one orifice plate, the at least one orifice plate downstream of the at least one three-way valve and upstream of the first plurality of evaporative cooling media; and
   at least one check valve, the at least one check valve plate downstream of the at least one three-way valve and upstream of the first plurality of evaporative cooling media.

10. The system of claim 4, wherein the at least four evaporative cooling media are equally spaced in series relative to an air flow path.

11. The system of claim 1, comprising:
    the gas turbine engine comprising:
    a compressor for providing compressed air;
    a combustor for combusting fuel mixed with the compressed air from the compressor;
    a turbine for receiving the combusted fuel and air from the combustor, the turbine mechanically coupled to the compressor;
    a generator for producing power, the generator mechanically coupled to the turbine or the compressor;
    an inlet filter house, the inlet filter house in fluid communication with and upstream of the compressor, the evaporative cooling system disposed within the inlet filter house, the evaporative cooling system providing cooled air to the compressor.

12. A control system for an evaporative cooling system of a gas turbine engine, the control system comprising:
- a controller configured to control the evaporative cooling system, wherein the evaporative cooling system comprises a plurality of evaporative cooling media, wherein each evaporative cooling medium of the plurality of evaporative cooling media is spaced from each other evaporative cooling medium of the plurality of evaporative cooling media;
- wherein the controller is configured to independently enable and disable fluid flow to each evaporative cooling medium of the plurality of evaporative cooling media to provide discrete levels of evaporative cooling, wherein an operational state of a respective evaporative cooling medium is in an on state of evaporative cooling when fluid flow is enabled, wherein the controller is configured to vary a number of the plurality of evaporative cooling media in the on state based on a load setpoint of the gas turbine engine and a priority between a first parameter and second parameter, wherein the first parameter benefits from a greater amount of evaporative cooling with increases in the load setpoint, and the second parameter benefits from a lesser amount of evaporative cooling with decreases in the load setpoint.

13. The control system of claim 12, wherein the controller is configured to selectively control the fluid flow to each of a first evaporative cooling level, a second evaporative cooling level and a third evaporative cooling level, wherein each of the first, second and third evaporative cooling levels are on different vertical levels of a gas turbine engine inlet filter house.

14. The control system of claim 12, wherein the controller is configured to selectively control the fluid flow to each of a first evaporative cooling medium, a second evaporative cooling medium, a third evaporative cooling medium, and a fourth evaporative cooling medium of the plurality of evaporative cooling media, wherein the controller is configured to vary the number of the first, second, third, and fourth evaporative cooling media in the on state to provide discrete levels of evaporative cooling.

15. The control system of claim 12, wherein the first and second parameters are selected from a plurality of control inputs and a plurality of measured operating parameters,
- wherein the plurality of control inputs comprises at least one of a gas turbine exhaust temperature limit, a gas turbine heat rate target, a gas turbine target load demand, a combined cycle heat rate target, a combined cycle target load demand, a gas turbine compressor discharge temperature limit, a water expense input, a gas turbine parts life input, and a gas turbine combustor dynamics input, and
- wherein the plurality of measured operating parameters comprises at least one of an ambient temperature, a relative humidity, an inlet guide vane (IGV) position, a compressor inlet temperature, a plant heat rate, a plant output load, a gas turbine exhaust temperature, a compressor discharge temperature, a combustor firing temperature, a steam temperature and a steam flow.

16. The control system of claim 12, wherein the first parameter comprises a power output of the gas turbine engine, and the second parameter comprises a heat rate of the gas turbine engine.

17. A gas turbine engine comprising:
- a compressor for providing compressed air;
- a combustor for combusting fuel mixed with the compressed air from the compressor;
- a turbine for receiving the combusted fuel and air from the combustor, the turbine mechanically coupled to the compressor;
- a generator for producing power, the generator mechanically coupled the turbine or the compressor;
- an inlet filter house, the inlet filter house in fluid communication with and upstream of the compressor; and
- an evaporative cooling system, the evaporative cooling system disposed within the inlet filter house, the evaporative cooling system providing cooled air to the compressor, the evaporative cooling system comprising:
  - a plurality of evaporative cooling media, wherein each evaporative cooling medium of the plurality of evaporative cooling media is spaced from every other evaporative cooling medium of the plurality of evaporative cooling media; and
  - a controller configured to control the evaporative cooling system, wherein the controller is configured to independently enable and disable fluid flow to each evaporative cooling medium of the plurality of evaporative cooling media to provide discrete levels of evaporative cooling, wherein an operational state of a respective evaporative cooling medium is in an on state of evaporative cooling when fluid flow is enabled, wherein the controller is configured to vary a number of the plurality of evaporative cooling media in the on state based on a load setpoint of the gas turbine engine and a priority between a first parameter and second parameter, wherein the first parameter benefits from a greater amount of evaporative cooling with increases in the load setpoint, and the second parameter benefits from a lesser amount of evaporative cooling with decreases in the load setpoint.

* * * * *